(12) United States Patent
Tang et al.

(10) Patent No.: US 7,915,845 B2
(45) Date of Patent: Mar. 29, 2011

(54) MOTOR CONTROL METHOD AND DEVICE THEREOF

(75) Inventors: Chung-Hung Tang, Taoyuan Hsien (TW); Chin-Fa Chiu, Taoyuan Hsien (TW); Chun-Lung Chiu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 170 days.

(21) Appl. No.: 12/111,752

(22) Filed: Apr. 29, 2008

(65) Prior Publication Data

US 2008/0292291 A1 Nov. 27, 2008

(30) Foreign Application Priority Data

May 25, 2007 (TW) .................................. 96118694

(51) Int. Cl.
*H02P 7/00* (2006.01)
(52) U.S. Cl. ........................ 318/432; 318/599; 318/811

(58) Field of Classification Search .................. 318/599, 318/811, 432, 461, 801, 798; 388/907, 910
See application file for complete search history.

(56) References Cited

U.S. PATENT DOCUMENTS

| 5,187,427 | A  | * | 2/1993  | Erdman      | 323/207    |
|-----------|----|---|---------|-------------|------------|
| 5,526,252 | A  | * | 6/1996  | Erdman      | 363/41     |
| 6,307,336 | B1 | * | 10/2001 | Goff et al. | 318/400.09 |
| 6,801,009 | B2 | * | 10/2004 | Makaran et al. | 318/599 |
| 7,075,267 | B1 | * | 7/2006  | Cheng       | 318/807    |

* cited by examiner

*Primary Examiner* — Rina I Duda
(74) *Attorney, Agent, or Firm* — Muncy, Geissler, Olds & Lowe, PLLC

(57) ABSTRACT

A motor control method and a motor control device are provided. The control method includes the steps of receiving a current feedback signal from a coil switching circuit, while the motor is rotating, for generating a separate signal, and comparing the current feedback signal and the separate signal for generating a motor control signal so as to control the operation of the motor.

10 Claims, 6 Drawing Sheets

MOTOR CONTROL METHOD AND DEVICE THEREOF

CROSS REFERENCE TO RELATED APPLICATIONS

This Non-provisional application claims priority under 35 U.S.C. §119(a) on Patent Application No(s). 096118694, filed in Taiwan, Republic of China on May 25, 2007, the entire contents of which are hereby incorporated by reference.

BACKGROUND OF THE INVENTION

1. Field of the Invention

The present invention relates to a motor control method and device thereof, and more particularly to control methods and devices for improving a motor control signal to increase the operating performance of a motor.

2. Description of the Related Art

Today, motor control methods are sophisticated and advanced technology of utilizing circuits to control motor rotation has been provided. Furthermore, circuits are used to change or limit motor rotational speed, along with other functionalities of motor control. A well-known motor control device is shown in FIG. 1. The hall sensor 12 of the motor control device 1 detects a phase signal generated during the operation of the motor, and the phase signal is equal to the phase switched by a coil set 20 of the motor. The motor driver 10 is electrically coupled to the Hall sensor 12, receives the phase signal from Hall sensor 12 to generate a motor control signal. FIG. 2 shows the waveform of motor control signal 21. Ordinate A designates the amplitude of waveform, which can be represented as a voltage, while abscissa t designates time. Meanwhile, the coil switching circuit 14 often consists of two MOS switches. When the motor control signal 21 between two adjacent phases of current generated by the motor driver 10 is input into the coil switching circuit 14, the coil switching circuit 14 will output the motor control signal 21 sequentially into the motor coil set 20 to switch the current flow of to sustain motor rotation. Moreover, the PWM generating circuit 16 can modulate the motor control signal 21 as uniform-distributed rectangular waves by way of the pulse width modulation (PWM). Referring to FIG. 3. After the motor control signal 21 is divided into several small rectangular waves, the motor control signal 21 is equalized to smaller amplitude according to the equivalent principle. Inputting the equivalent motor control signal 21 into the motor coil set 20 will slow the motor rotational speed. Conventional motor driving methods use fixed duty cycle to turn on or off the coil switching circuit 14 to control the motor rotational speed. The current signal 22 is shown in FIG. 4. Ordinate A designates the amplitude of waveform, which can be represented as a current, and abscissa t designates time. FIG. 4 shows that current peaks at P1 and P2 have very high current during polarity switching, and these two current peaks result from the fact that inducing element (motor coil set 20) stores or releases energy during electrical conduction. The efficiency and current status of the motor, however, are not optimal for conventional motor driving. For example, in FIG. 4 the operating efficiency of the motor in concave area P is worse than that in other areas. Accordingly, the operating efficiency could be optimal if the current is similar to direct current.

BRIEF SUMMARY OF THE INVENTION

The present invention provides a motor control method, mainly improving a motor control signal to increase the operating efficiency of a motor. First, a current feedback signal is detected from a coil switching circuit by a current sampling circuit during the operation of the motor. Next, a separate signal is generated by a separate signal generating circuit. The current feedback signal is compared with the separate signal to generate a motor control signal to control the operation of the motor.

The present invention also provides a motor control device, including a coil switching circuit, a motor driver, a separate signal generating circuit, a current sampling circuit, and a comparison circuit. The motor driver is electrically coupled to the coil switching circuit and is provided to control the coil switching circuit to switch phases. The current sampling circuit is electrically coupled to the coil switching circuit and is provided to acquire a current feedback signal from the coil switching circuit and output it. The comparison circuit is electrically coupled to the current sampling circuit, the separate signal generating circuit, and the motor driver respectively. The comparison circuit is for comparing the current feedback signal with the separate signal to generate a motor control signal, and inputting the motor control signal into the motor driver to control the operation of a motor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
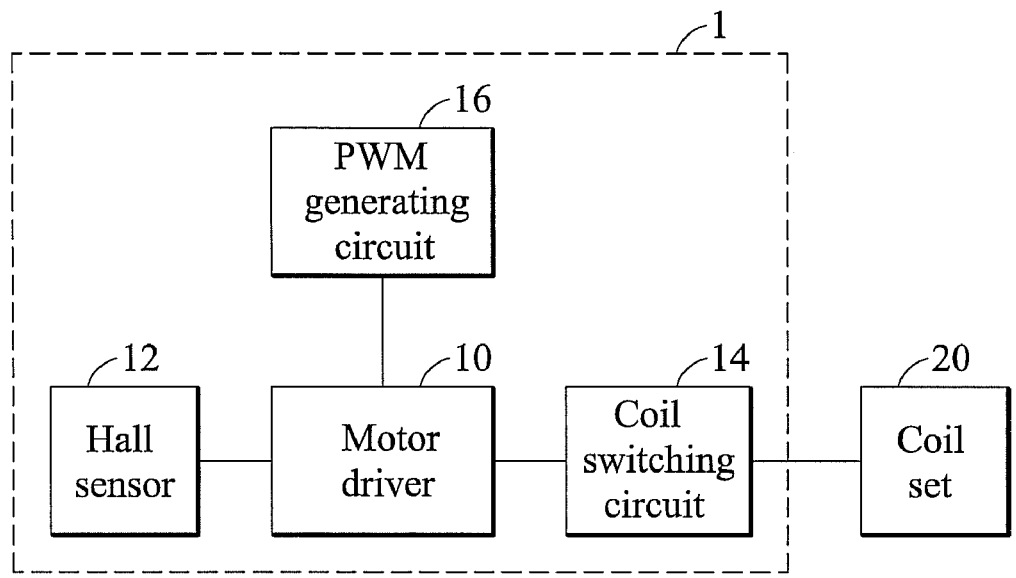
FIG. 1 shows a block diagram of a conventional motor control device.
Figure 2:
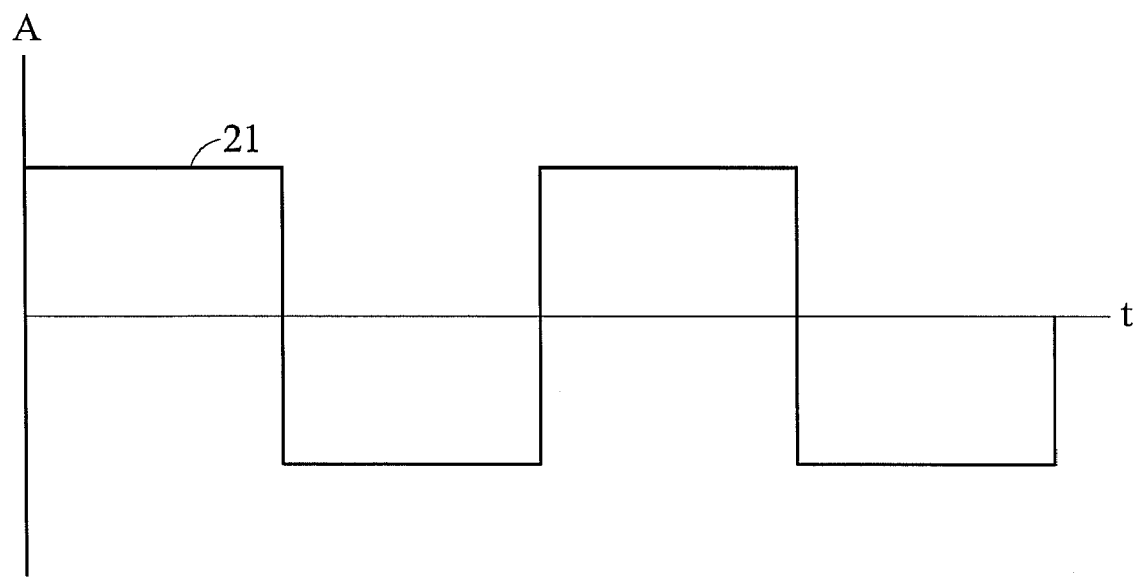
FIG. 2 shows a waveform of a conventional motor control signal.
Figure 3:
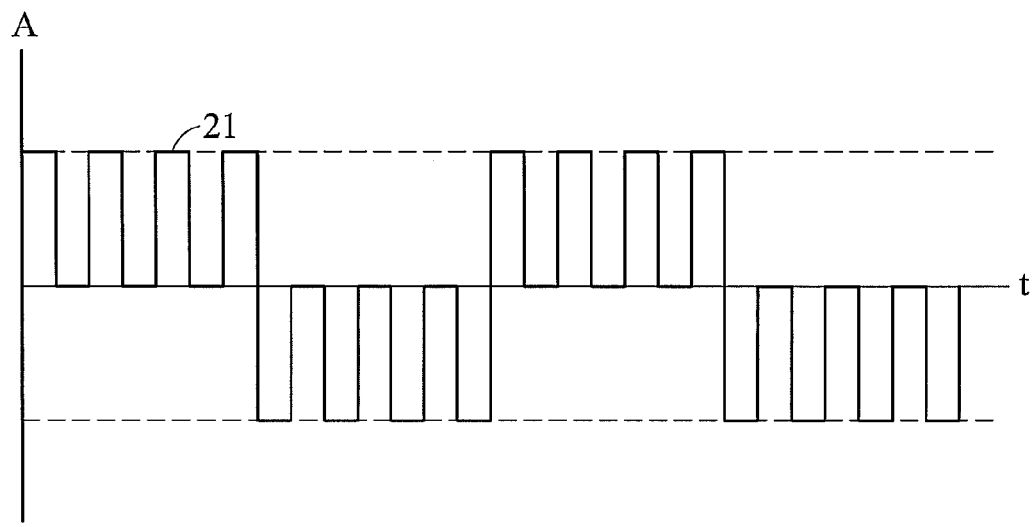
FIG. 3 shows a waveform of a conventional motor control signal with modulated PWM signal.
Figure 4:
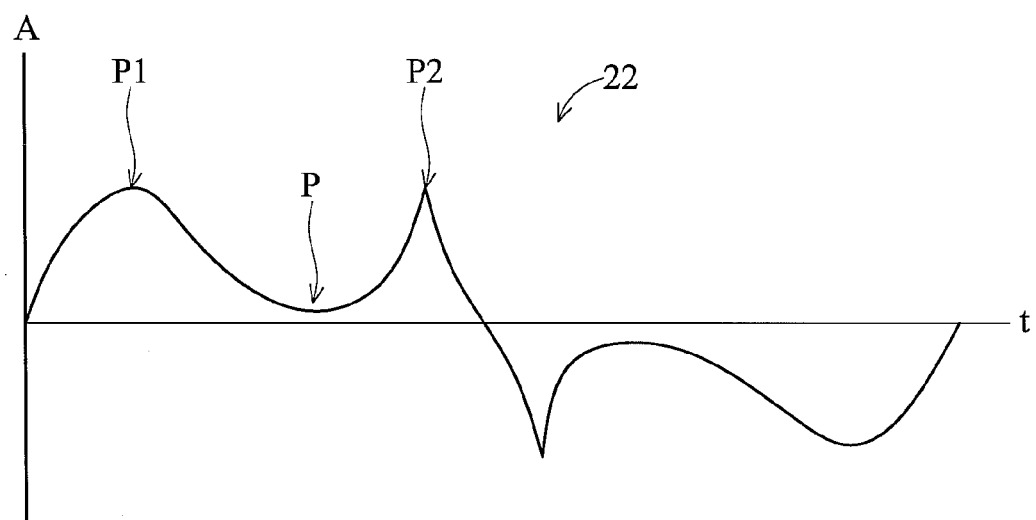
FIG. 4 shows a current waveform of a conventional motor control device.
Figure 5:
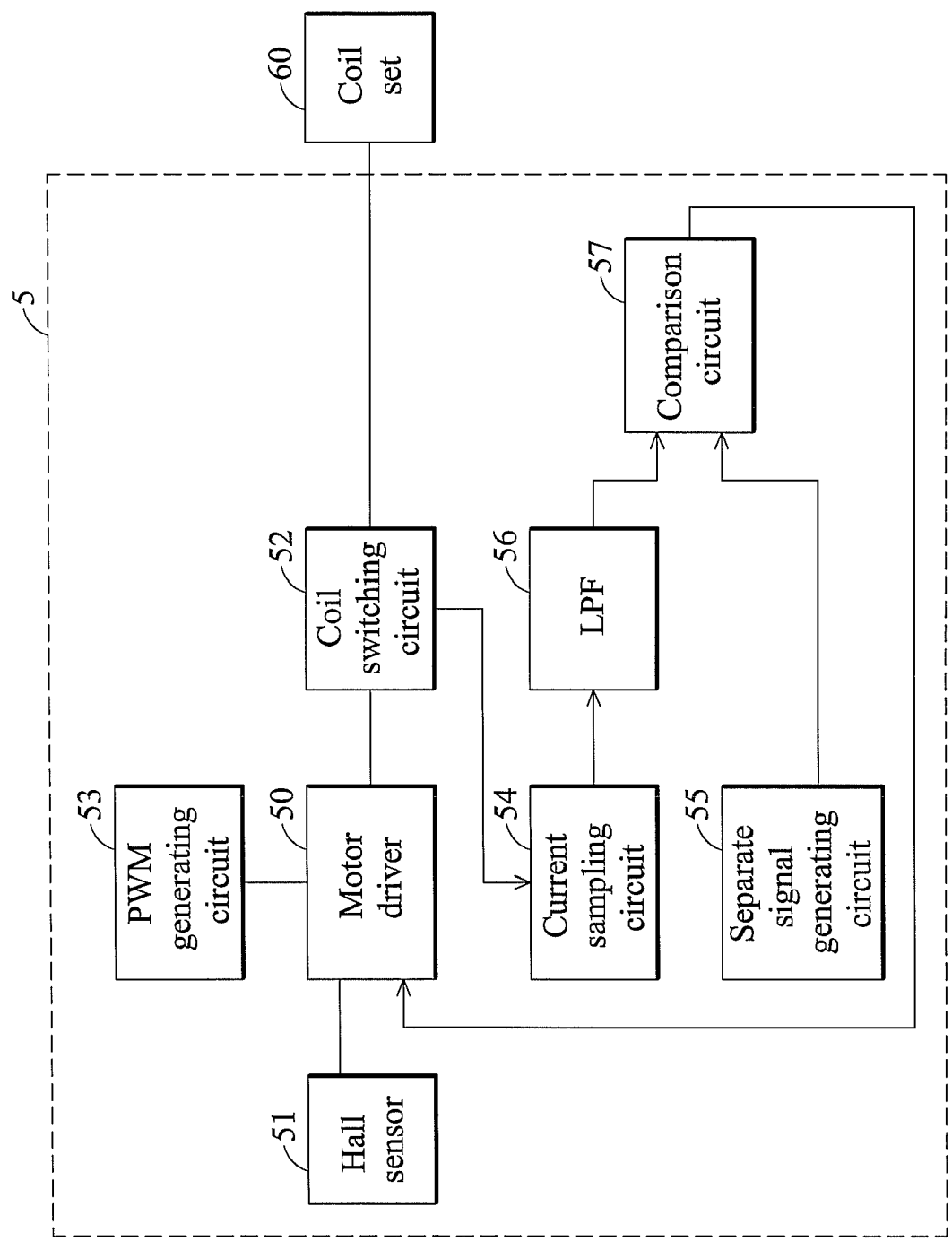
FIG. 5 shows a block diagram of a motor control device according to an embodiment of the present invention.
Figure 6:
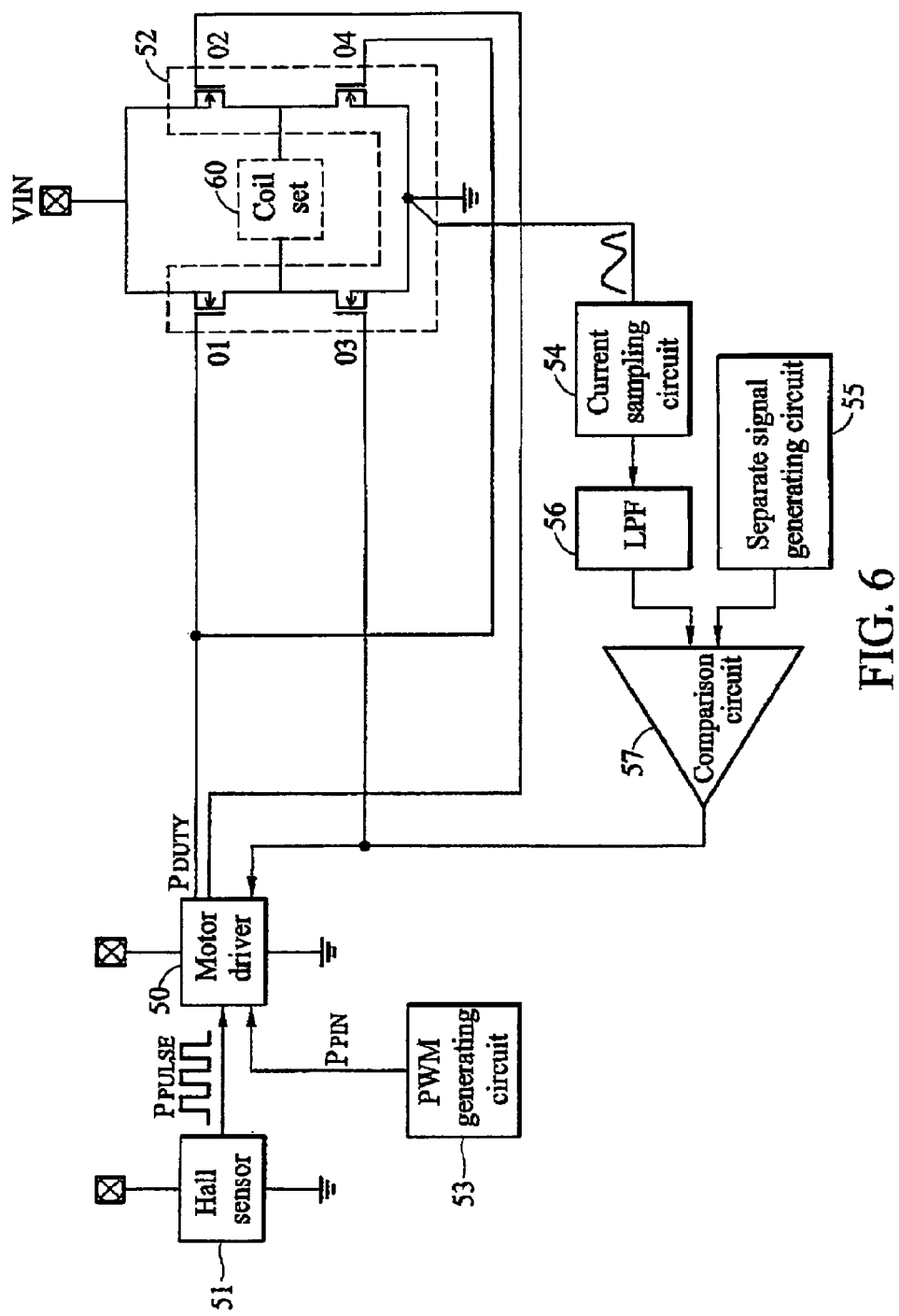
FIG. 6 shows circuitry of the motor control device according to an embodiment of the present invention.

FIG. 5 and FIG. 6 are respectively the block diagram and circuitry of the motor control device 5 of the first embodiment according to the present invention. The motor control device 5 includes motor driver 50, the phase signal sampling circuit (the hall sensor 51 in this embodiment), the coil switching circuit 52, the PWM generating circuit 53, the current sampling circuit 54, the separate signal generating circuit 55, the low pass filter 56, and the comparison circuit 57. The motor driver 50, the hall sensor 51, the PWM generating circuit 53, and the coil switching circuit 52 are well known in the art and not described in detail for brevity.

The separate signal generating circuit 55 is provided to generate a separate signal. The current sampling circuit 54 is electrically coupled to the coil switching circuit 52 and the low pass filter 56, and provided to acquire a current feedback signal from the coil switching circuit 52 during the operation of the motor and output the current feedback signal to the low pass filter 56. The low pass filter 56 is electrically coupled to the current sampling circuit 54 and the comparison circuit 57, and provided to receive the current feedback signal from the current sampling circuit 54 and eliminate the phase voltage of the current feedback signal to output to the comparison circuit 57. The comparison circuit 57 has two inputs electrically coupled to the low pass filter 56 and the separate signal generating circuit 55 respectively, and one output electrically coupled to the motor driver 50. The comparison circuit 57 is provided to compare the current feedback signal with the separate signal to generate a motor control signal, and output the motor control signal to the motor driver 50. The motor driver 50 controls the coil switching circuit 52 by the motor control signal to switch the phases of the motor coil set 60 to sustain motor operation.

The motor driver 50 can also acquire a PWM signal from the PWM generating circuit 53 to modulate the motor control signal to change the rotational speed of the motor.

Figure 7:
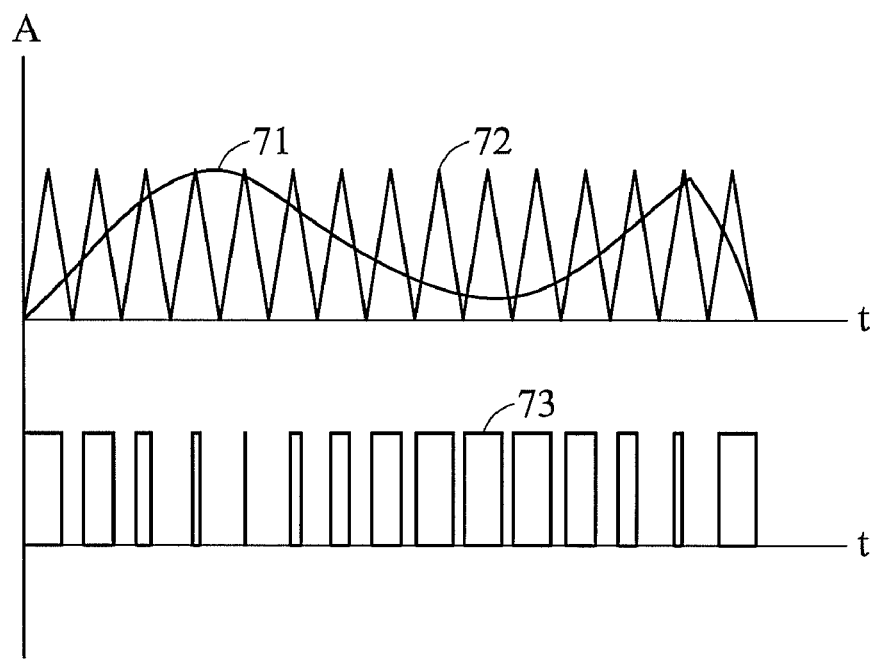
FIG. 7 shows a waveform of a motor control signal according to an embodiment of the present invention.

FIG. 7 shows the waveforms of the current feedback signal 71 and the separate signal 72. Ordinate A designates the amplitude of the waveforms, which can be represented as voltage (it can also be represented as current or power in other embodiments due to the proportional relationship between voltage, current, and power), and abscissa t designates time. In FIG. 7 the separate signal 72 generated from the separate signal generating circuit 55 consists of continuous and regular-distributed triangular waves. The separate signal 72, however, is not limited to be triangular waves, and it can also consist of regular-distributed trapezoid, sine, or polygonal waves, or other waveforms depending on requirements. Meanwhile, the motor control signal 73 can be generated after the current feedback signal 71 is compared with the separate signal 72 by the comparison circuit 57. When the separate signal 72 is higher than the current feedback signal 71, the comparison circuit 57 outputs a high level signal. When the separate signal 72 is lower than the current feedback signal 71, the comparison circuit 57 outputs a low level signal. Therefore, the motor control signal 73 is generated. The motor control signal 73 consists of rectangular waves, and the width of the rectangular waves is varied with the amplitude of the current feedback signal 71. For example, the width of the rectangular waves are wider when the amplitude of the current feedback signal 71 is lower (the concave region in FIG. 7); on the other hand, the width of the rectangular waves are narrower when the amplitude of the current feedback signal 71 is higher (the convex region in FIG. 7).

Figure 8:
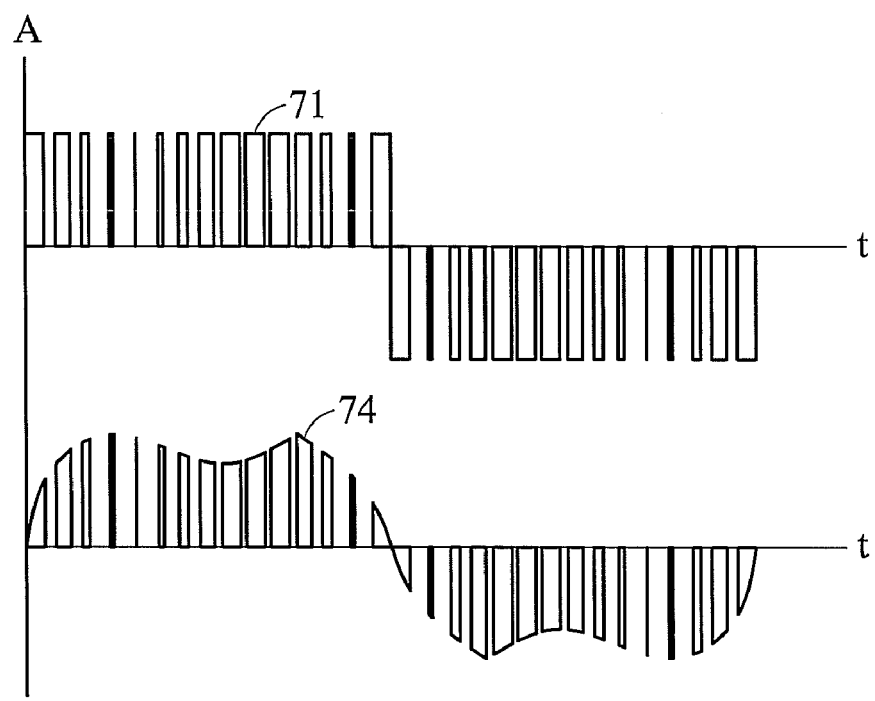
FIG. 8 shows a current waveform of an equivalent motor control signal, according to an embodiment of the present invention.

Referring to FIG. 8, the motor control signal 73 is output to the motor driver 50 to control the operation of motor, and the waveform of an equivalent current signal 74 approaches the ideal direct current. Therefore, allowing the motor to be operated more efficiently.

Furthermore, since the motor control device 5 continuously outputs the motor control signal 73 to the motor coil set 60, the motor control signal 73 is also continuously adjusted with a new generated equivalent current signal 74 to improve the operation of the motor.

Figure 9:
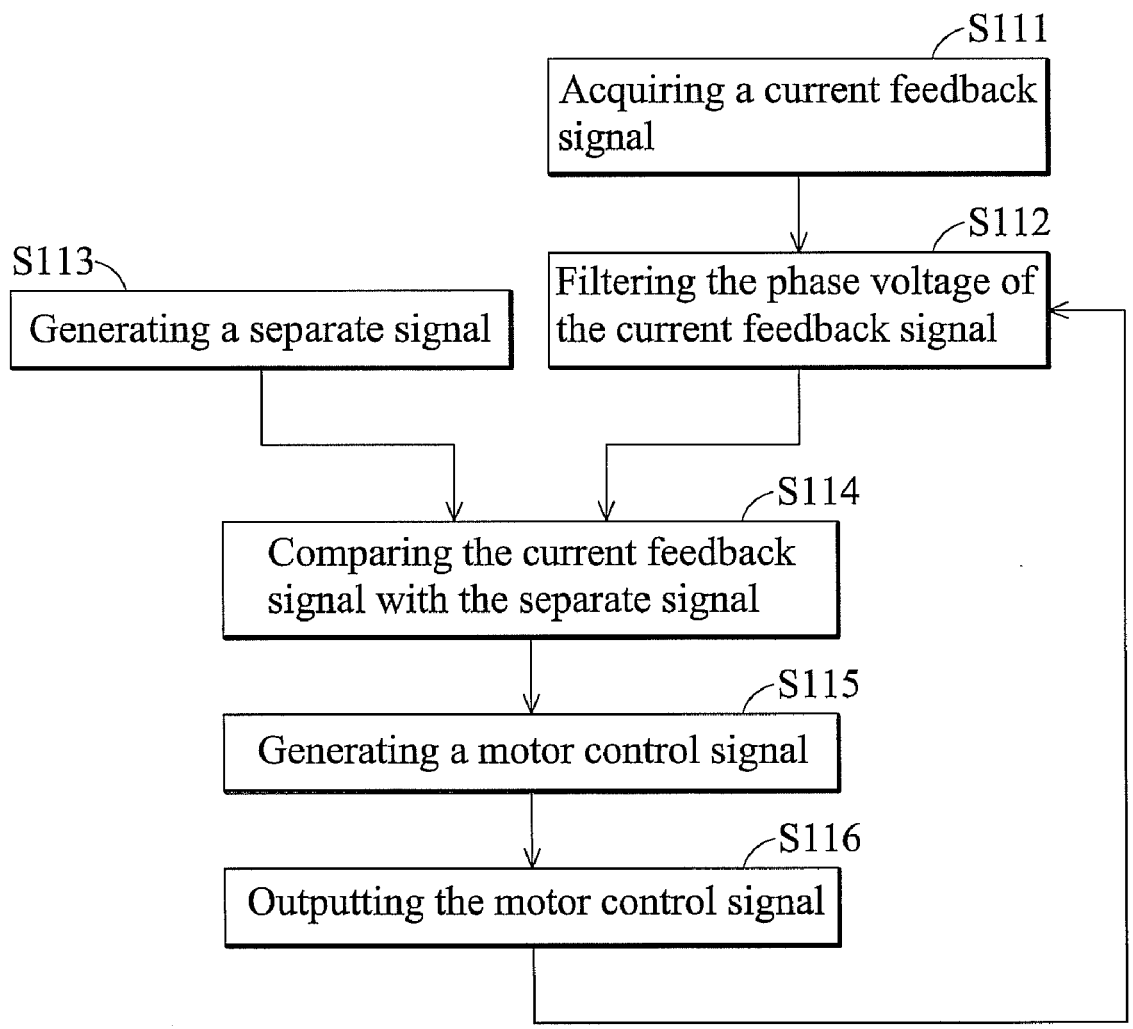
FIG. 9 shows a flowchart of a motor control method according to an embodiment of the present invention.

FIG. 9 shows a motor control method of an embodiment according to the present invention. The method mainly allows the motor control signal 73 to improve the operating efficiency of the motor, of which steps are described in detail as follows.

At first, the equivalent current feedback signal 71 is detected and acquired by the current sampling circuit 54 from the coil switching circuit 52 during the operation of the motor (step S111). The phase voltage is eliminated from the current feedback signal 71 by low pass filter 56 (step S112).

The separate signal 72 is generated by the separate signal generating circuit 55, and consists of several continuous and regular-distributed separate waves, such as triangular waves, trapezoid waves, or polygonal waves (step S113).

The motor control signal 73 is generated after comparing the current feedback signal 71 with the separate signal 72, i.e. a new generated motor control signal 73 for rotational speed control of the motor (steps S114 and S115).

The motor control signal 73 is outputted to the motor driver 50 to control the motor coil set 60 to sustain the operation of the motor (step S116).

In summary, by comparing the current feedback signal with the separate signal to generate a motor control signal to control the operation of the motor, the motor control method and the motor device of the present invention can improve the operating efficiency of the motor since the waveform of the new generated equivalent current is similar to a direct current.

While the present invention has been described by way of examples and in terms of preferred embodiments, it is to be understood that the present invention is not limited thereto. Any variation or modification can be made by those skilled in art without departing from the spirit or scope of the present invention. Therefore, the scope of the appended claims should be accorded the broadest interpretation to encompass all such modifications and similar arrangements.

What is claimed is:

1. A motor control method, comprising steps of:
   acquiring a current feedback signal;
   generating a separate signal; and
   comparing the current feedback signal with the separate signal and generating a motor control signal to control a rotational speed of a motor;
   wherein the separate signal is acquired from a separate signal generating circuit and comprises a plurality of continuous and uniform-distributed signals which are triangular, sine, trapezoid, or polygonal waves,
   wherein the motor control signal comprises a plurality of rectangular waves, the width of the rectangular waves is wider when the amplitude of the current feedback signal is lower, and the width of the rectangular waves is narrower when the amplitude of the current feedback signal is higher within the predetermined phase range.

2. The motor control method of claim 1, wherein the current feedback signal is generated from a coil switching circuit of the motor when a current sampling circuit is detecting the operation of the motor.

3. The motor control method of claim 1, wherein the current feedback signal further comprises a phase signal and the phase signal is eliminated by a low pass filter before the current feedback signal is compared with a separate signal.

4. A motor control device, comprising:
   a coil switching circuit;
   a motor driver, electrically coupled to the coil switching circuit, for controlling the coil switching circuit to switch phases;
   a current sampling circuit, electrically coupled to the coil switching circuit, for acquiring a current feedback signal from the coil switching circuit and output the current feedback signal;
   a separate signal generating circuit, for generating and outputting a separate signal which is a triangular, sine, trapezoid, or polygonal wave; and
   a comparison circuit, electrically coupled to the current sampling circuit, the separate signal generating circuit, and the motor driver respectively, for comparing the current feedback signal with the separate signal to generate a motor control signal, and output the motor control signal to the motor driver to control a rotational speed of the motor;

wherein the width of the rectangular waves is wider when the amplitude of the current feedback signal is lower, and the width of the rectangular waves is narrower when the amplitude of the current feedback signal is higher within the predetermined phase range.

5. The motor control device of claim 4, wherein the comparison circuit outputs a high level signal when the separate signal is higher than the current feedback signal, and the comparison circuit outputs a low level signal when the separate signal is lower than the current feedback signal.

6. The motor control device of claim 4, wherein the separate signal comprises a plurality of continuous and uniform-distributed signals.

7. The motor control device of claim 4, further comprising a phase signal sampling circuit, electrically coupled to the motor driver, provided to detect a phase signal during the operation of the motor, and output the phase signal to the motor driver.

8. The motor control device of claim 7, wherein the phase signal sampling circuit is a Hall sensor.

9. The motor control device of claim 4, further comprising a low pass filter, electrically coupled to the current sampling circuit and the comparison circuit respectively, provided to eliminate a phase signal in the current feedback signal and output the current feedback signal to the comparison circuit.

10. The motor control device of claim 4, further comprising a PWM generating circuit, electrically coupled to the motor driver, provided to modulate the motor control signal received by the motor driver to change the rotational speed of the motor.

* * * * *